US010961755B2

(12) United States Patent
Oh et al.

(10) Patent No.: US 10,961,755 B2
(45) Date of Patent: Mar. 30, 2021

(54) OVEN

(71) Applicant: Samsung Electronics Co., Ltd., Suwon-si (KR)

(72) Inventors: Dong Jin Oh, Yongin-si (KR); Eun-Oh Kim, Seoul (KR); Tae Youl Lee, Suwon-si (KR); Geun Yong Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/104,664

(22) Filed: Aug. 17, 2018

(65) Prior Publication Data

US 2019/0063130 A1 Feb. 28, 2019

(30) Foreign Application Priority Data

Aug. 31, 2017 (KR) .......................... 10-2017-0111499

(51) Int. Cl.
*A47B 81/00* (2006.01)
*E05D 11/00* (2006.01)
(Continued)

(52) U.S. Cl.
CPC ............ *E05D 11/00* (2013.01); *E05F 1/1276* (2013.01); *F24C 15/023* (2013.01); *A21B 3/02* (2013.01);
(Continued)

(58) Field of Classification Search
CPC ...... F24C 15/023; E05C 7/005; E05F 1/1276; E05Y 2900/308
See application file for complete search history.

(56) References Cited

U.S. PATENT DOCUMENTS 2,592,333 A * 4/1952 Reeves ................. F24C 15/023
126/194
4,021,968 A * 5/1977 Kendall ................ E05D 11/105
49/386
(Continued)

FOREIGN PATENT DOCUMENTS

CA          2951634 A1 * 12/2015 .............. F24C 15/02
DE      299 04 129 U1    6/2000
(Continued)

OTHER PUBLICATIONS

International Search Report dated Dec. 14, 2019, issued in International Patent Application No. PCT/KR2018/010001.
(Continued)

*Primary Examiner* — Matthew W Ing
(74) *Attorney, Agent, or Firm* — Jefferson IP Law, LLP

(57) ABSTRACT

An oven having an improved hinge structure of a door, which is capable of preventing deformation of the door and opening a part of a plurality of cooking chambers is provided. The oven includes a main body, a cooking chamber provided inside of the main body, a first door rotatably coupled to the main body by a first hinge unit to open or close the cooking chamber, the first door including a door frame having an opening, at least one reinforcing unit coupled to the door frame, and configured to prevent deformation of the first door, a second door rotatably coupled to the first door, and configured to open or close the opening, and a second hinge unit configured to enable the second door to be rotatably coupled to the first door, and including a hinge shaft positioned behind a front surface of the first door.

21 Claims, 20 Drawing Sheets

(51) Int. Cl.
*F24C 15/02* (2006.01)
*E05F 1/12* (2006.01)
*A21B 3/02* (2006.01)
*E05D 3/02* (2006.01)
*E05D 5/06* (2006.01)

(52) U.S. Cl.
CPC .................. *E05D 3/02* (2013.01); *E05D 5/06* (2013.01); *E05Y 2800/682* (2013.01); *E05Y 2900/302* (2013.01); *E05Y 2900/308* (2013.01)

(56) References Cited

U.S. PATENT DOCUMENTS

| | | | | |
|---|---|---|---|---|
| 4,163,344 | A * | 8/1979 | Scherer | F24C 15/023 49/386 |
| 5,025,776 | A * | 6/1991 | Hanley | E05F 1/1276 126/194 |
| 5,341,542 | A * | 8/1994 | Hannan | A47B 46/005 126/194 |
| 3,286,706 | A | 11/1996 | Hoppe | |
| 6,453,510 | B1 * | 9/2002 | Cummins | E05F 1/1276 126/194 |
| 8,936,331 | B2 | 1/2015 | Coxon | |
| 2007/0101542 | A1 * | 5/2007 | Lee | E05F 1/1276 16/286 |
| 2007/0209654 | A1 * | 9/2007 | Wang | E05F 1/1276 126/194 |
| 2010/0229344 | A1 * | 9/2010 | Donoho | E05F 1/1276 16/333 |
| 2012/0067333 | A1 * | 3/2012 | Mirshekari | E05F 1/1041 126/192 |
| 2016/0215550 | A1 * | 7/2016 | Xiao | E05D 7/12 |
| 2016/0348919 | A1 * | 12/2016 | Ivanovic | F24C 15/023 |
| 2017/0122568 | A1 | 5/2017 | Ivanovic et al. | |
| 2018/0216832 | A1 * | 8/2018 | White | E05F 5/02 |
| 2019/0063123 | A1 * | 2/2019 | Ham | E05C 7/02 |

FOREIGN PATENT DOCUMENTS

| | | |
|---|---|---|
| EP | 0 576 732 A1 | 1/1994 |
| EP | 3 155 323 A1 | 4/2017 |
| FR | 2 829 792 A3 | 3/2003 |
| JP | 2000-227224 A | 8/2000 |
| JP | 2014-134312 A | 7/2014 |
| KR | 10-2007-0077841 A | 7/2007 |
| KR | 10-0774205 B1 | 11/2007 |
| KR | 10-2008-0082183 A | 9/2008 |
| KR | 10-2011-0055076 A | 5/2011 |
| KR | 10-1230227 B1 | 2/2013 |
| KR | 10-2014-0045202 A | 4/2014 |
| KR | 10-1526802 B1 | 6/2015 |
| KR | 10-2015-0141865 A | 12/2015 |
| KR | 10-1601858 B1 | 3/2016 |

OTHER PUBLICATIONS

European Search Report dated Jun. 24, 2020, issued in European Application No. 18849572.5.

\* cited by examiner

OVEN

CROSS-REFERENCE TO RELATED APPLICATION(S)

This application is based on and claims priority under 35 U.S.C. § 119(a) of a Korean patent application number 10-2017-0111499, filed on Aug. 31, 2017, in the Korean Intellectual Property Office, the disclosure of which is incorporated by reference herein in its entirety.

BACKGROUND

1. Field

The disclosure relates to an oven having an improved hinge structure of a door, which is capable of preventing deformation of the door and opening a part of a plurality of cooking chambers.

2. Description of the Related Art

An oven, which is cooking heating and cooking food or cooking material, is classified into an electric oven, a gas oven, and an electronic oven (also, called a microwave oven) according to a heat source.

The electric oven uses an electric heater as a heat source, and the gas oven and the microwave oven use heat generated by gas and friction heat of water molecules generated by high frequency radio waves, respectively, as heat sources.

The oven includes a main body forming the outer appearance of the oven, a cooking chamber which is formed inside of the main body, and a door rotatably coupled to the body to open or close the cooking chamber.

A user cooks cooking material by placing the cooking material into the cooking chamber, sealing the cooking chamber, and operating a heater to heat the cooking chamber.

At this time, the cooking chamber is heated to an appropriate temperature depending on the type and amount of food.

In general, the door is mounted on the main body to open and close the entire of the cooking chamber. However, an oven may include a plurality of cooking chambers. In this case, a user should open the cooking chambers in order to check the status of a food during a cooking process even though only a part of the cooking chambers are used, resulting in the user's inconvenience and heat loss.

Further, since the door is supported only by support frames respectively coupled to both sides, the door may be deformed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an oven capable of preventing deformation of a door, and opening or closing a part of a cooking chamber without opening or closing the entire of the cooking chamber.

Another aspect of the disclosure is to provide an oven in which a hinge structure of a door capable of opening or closing a part of a cooking chamber is improved.

Additional aspects will be set forth in part in the description which follows and, in part, will be apparent from the description, or may be learned by practice of the presented embodiments.

In accordance with an aspect of the disclosure, an oven is provided. The oven includes a main body, a cooking chamber inside of the main body, a first door rotatably coupled to the main body by a first hinge unit to open or close the cooking chamber and including a door frame having an opening, at least one reinforcing unit coupled to the door frame to prevent deformation of the first door, a second door rotatably coupled to the first door to open or close the opening, and a second hinge unit to couple the second door to the first door and including a hinge shaft positioned behind a front surface of the first door and below a lower end of the second door.

The cooking chamber further comprises a divider configured to divide the cooking chamber into a first cooking chamber and a second cooking chamber, wherein the first cooking chamber is disposed in an upper portion of the cooking chamber and the second cooking chamber is disposed in a lower portion of the cooking chamber. The opening may be disposed to correspond to the second cooking chamber, and the hinge shaft may be positioned below a lower end of the divider.

The second hinge unit may further include a hinge holder coupled to the door frame, a hinge frame coupled to the second door, and a hinge link to allow the hinge frame to be rotatably connected to the hinge holder.

The hinge link may include a hinge portion coupled to the hinge shaft to rotate with the hinge shaft, a hinge frame fixing portion fixed to the hinge frame, and a link portion to connect the hinge portion to the hinge frame fixing portion and having a U-shape.

The hinge frame and the hinge link may be rotatable about the hinge shaft when the second door is opened or closed. The link portion may have the U-shape to prevent interference with the first door when the second door is opened or closed.

In accordance with another aspect of the disclosure, an oven is provided. The oven includes a main body, a cooking chamber inside of the main body, the cooking chamber including a divider into a first cooking chamber and a second cooking chamber, wherein the first cooking chamber is disposed in an upper portion of the cooking chamber and the second cooking chamber is disposed in a lower portion of the cooking chamber, a first door rotatably coupled to the main body by a first hinge unit to open or close the cooking chamber and including a door frame having an opening at a position corresponding to the second cooking chamber, a second door rotatably coupled to the first door to open or close the opening, and a second hinge unit to couple the second door to the first door and including a hinge shaft positioned behind a front surface of the first door and below a lower end of the divider.

The second hinge unit may further include a hinge holder coupled to the door frame, a hinge frame coupled to the second door, and a hinge link to allow the hinge frame to be rotatably connected to the hinge holder.

The second hinge unit may further include a support rod configured to support a weight of the second door when the second door is opened or closed.

The hinge holder may include a door frame coupling hole coupled to the door frame, a fixing hook fixed to a reinforcing unit, a hinge hole to which the hinge shaft is rotatably coupled, and a first rotation hole to which a first end of the support rod is rotatably coupled.

The second hinge unit may further include an elastic member accommodated in the hinge frame to generate an elastic force, and, when the second door is opened, provide the elastic force in a direction in which the second door is closed, and a slider to connect the elastic member and the support rod.

The hinge link may include a hinge portion coupled to the hinge shaft to rotate with the hinge shaft, a hinge frame fixing portion fixed to the hinge frame, and a link portion to connect the hinge portion to the hinge frame fixing portion and having a U-shape.

A coupling bracket may be fixed to the hinge frame fixing portion by a fixing member, and the hinge frame may be coupled to the coupling bracket such that the hinge frame fixing portion is fixed to the hinge frame.

The coupling bracket may include a hinge link fixing hole fixed to the hinge frame fixing portion by the fixing member, and a coupling hole to which the hinge frame is coupled.

The support rod may include a second rotation hole provided at the first end of the support rod and rotatably coupled to the first rotation hole by a rotation shaft, and a slider connection hole provided at a second end of the support rod and connected to the slider by a connection member.

The slider may include a support rod connection hole connected to the slider connection hole by the connection member, and a first fixing bar the elastic member is fixed.

The hinge frame may include a plurality of support frame coupling holes coupled to a support frame provided in the second door, a guide rail to guide a movement of the slider, a guide hole to guide the support rod, and a second fixing bar to which the elastic member is fixed.

The guide rail may include a first stopper to restrict the movement of the slider when the second door is closed, and a second stopper to restrict the movement of the slider when the second door is opened.

The elastic member may be configured to accumulate, when the second door is opened, the elastic force while the slider moves from the first stopper to the second stopper along the guide rail, and when the second door is closed, provide the elastic force to the slider in the direction in which the second door is closed such that the slider moves from the second stopper to the first stopper along the guide rail.

In accordance with another aspect of the disclosure, an oven is provided. The oven includes a main body, a cooking chamber inside of the main body, a first door rotatably coupled to the main body by a first hinge unit to open or close the cooking chamber and including a door frame having an opening, a second door rotatably coupled to the first door to open or close the opening, and at least one reinforcing unit coupled to the door frame to prevent deformation of the first door and having a U-shaped cross-section.

The reinforcing unit may extend in a vertical direction of the first door and be coupled to opposite sides of the door frame. The reinforcing unit may include a reinforcing bracket having a "U-shaped cross-section and coupled to the door frame, and a reinforcing frame having a U-shaped cross-section and coupled to the reinforcing bracket.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
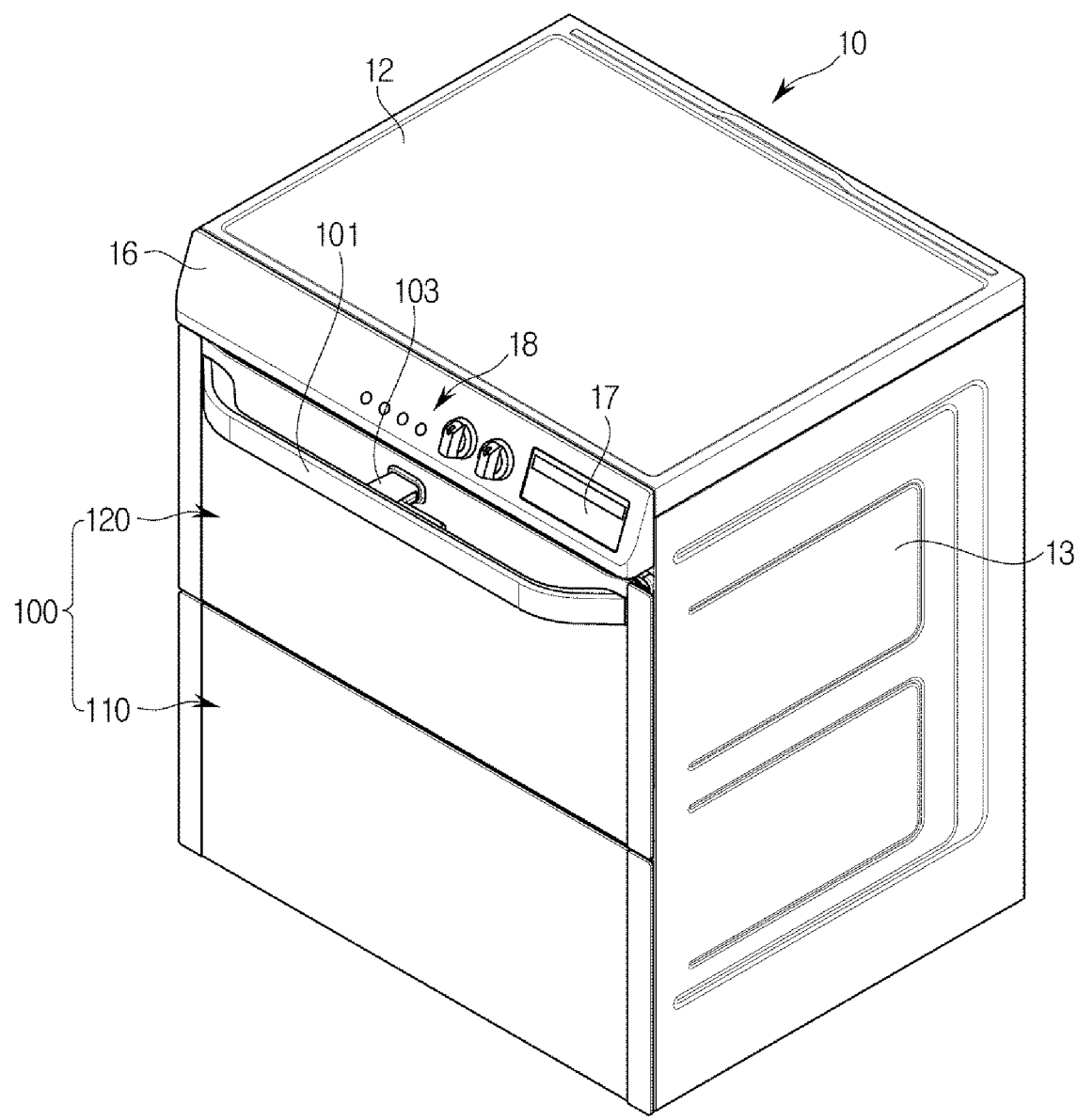
FIG. 1 is a perspective view illustrating an oven according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, like reference numerals or symbols denoted in the drawings of the present specification indicate elements or components that perform the substantially same functions.

Also, the terms used in the present specification are for describing embodiments and not for limiting or restricting the disclosure. It will be understood that the terms "includes," "comprises," "including," and/or "comprising," when used in this specification, specify the presence of stated features, figures, operations, components, or combination thereof. Therefore, they do not preclude the presence or addition of one or more other features, figures, operations, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

The terms "front end," "rear end," "upper portion," "lower portion," "upper end" and "lower end" used in the following description are defined based on the drawings. The shape and position of each component should not be limited by these terms.

Hereinafter, the embodiments according to the disclosure will be described in detail with reference to the accompanying drawings.

Figure 2:
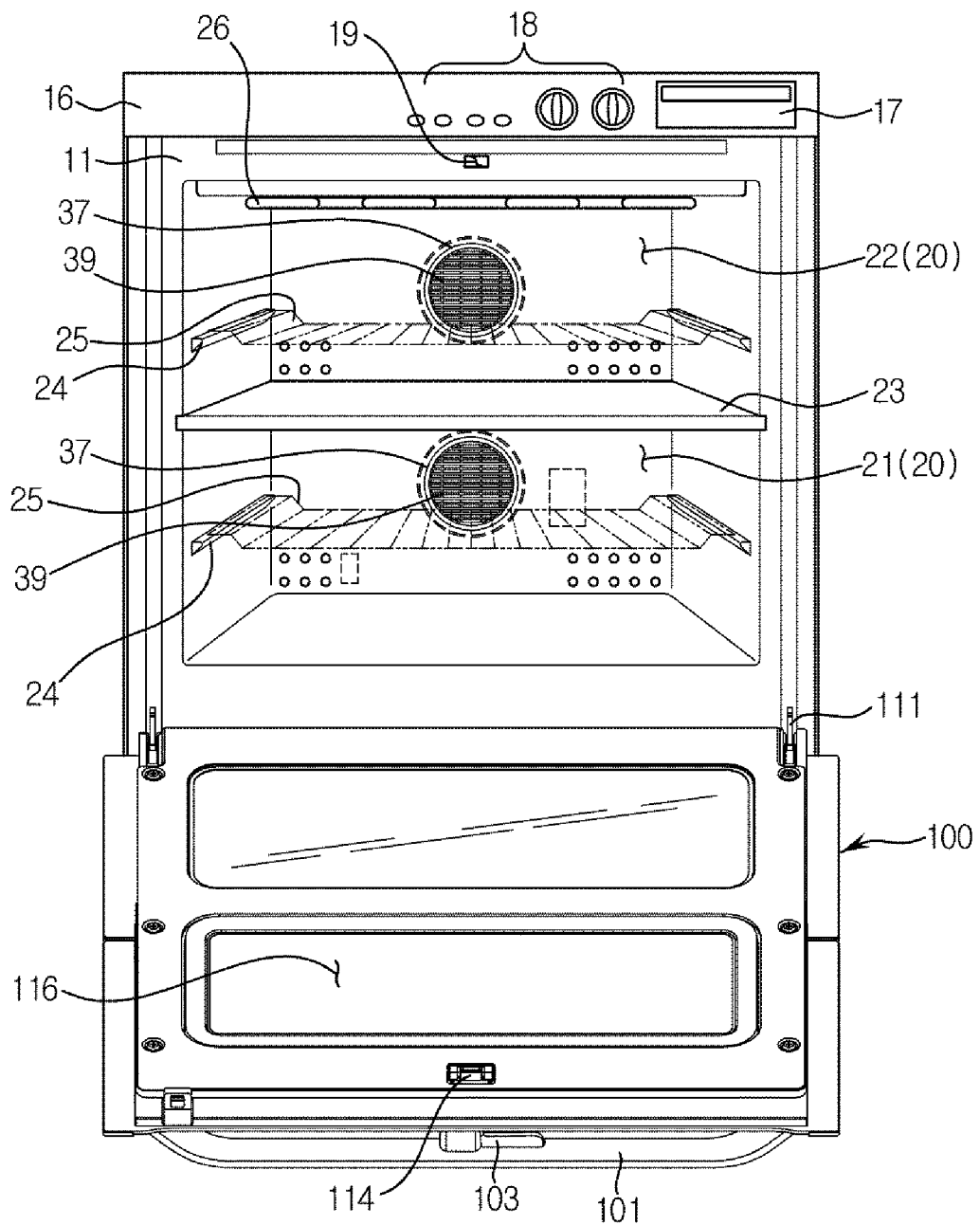
FIG. 2 is a view illustrating a state in which a door of an oven is open according to an embodiment of the disclosure is opened.
Figure 3:
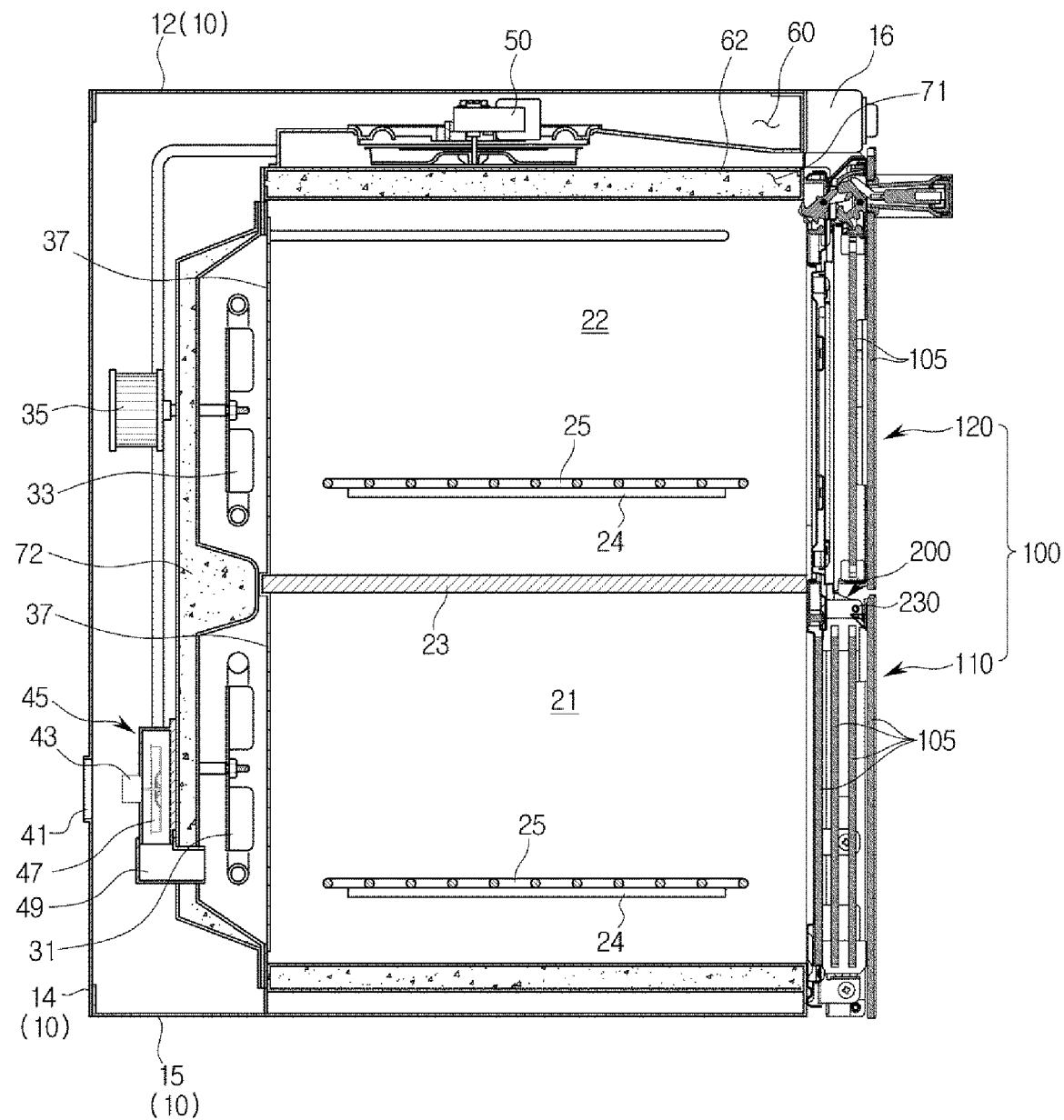
FIG. 3 is a cross-sectional view illustrating an oven according to an embodiment of the disclosure.
Figure 4:
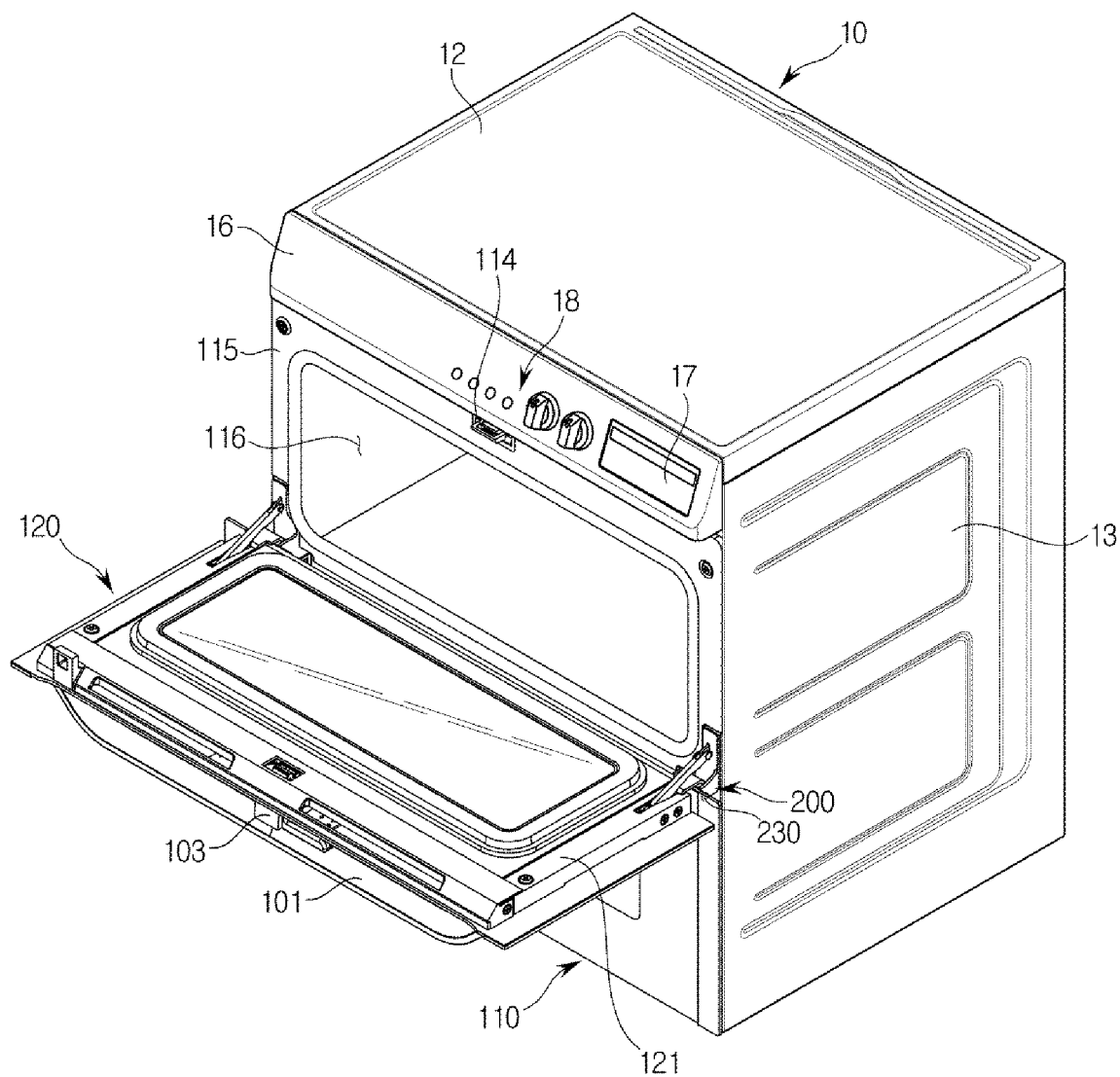
FIG. 4 is a view illustrating a state in which a second door of an oven is open according to an embodiment of the disclosure is opened.

FIG. 1 is a perspective view of an oven according to an embodiment of the disclosure, FIG. 2 is a view illustrating a state in a door of an oven is open according to an embodiment of the disclosure, FIG. 3 is a cross-sectional side view of an oven according to an embodiment of the disclosure, and FIG. 4 is a view illustrating a state in which a second door of an oven is open according to an embodiment of the disclosure.

Referring to FIGS. 1, 2, 3, and 4, an oven may include a main body 10, a cooking chamber 20 which is formed in the inside of the main body 10 and whose front portion opens, and a door 100 disposed on a front portion of the main body 10 to open or close the cooking chamber 20.

The main body 10 may include a front panel 11 forming a front surface of the oven, an upper panel 12 forming an upper surface of the oven, a pair of side panels 13 forming side surfaces of the oven, a rear panel 14 forming a rear surface of the oven, and a lower panel 15 forming a lower surface of the oven.

In a front upper portion of the front panel 11, a machine room cover 16 may cover a front portion of a machine room 60 which will be described below. The machine room cover 16 may be provided with a display 17 for displaying various operation information of the oven, and a control panel 18 for enabling a user to operate the oven.

The cooking chamber 20 may be formed in the shape of a box in the inside of the main body 10, and the user may insert and remove cooking material from the cooking chamber 20 through the open front portion of the cooking chamber 20.

The cooking chamber 20 may be divided by a divider 23 into a first cooking chamber 21 and a second cooking chamber 22 disposed above the first cooking chamber 21.

The first and second cooking chambers 21 and 22 may have different sizes. The divider 23 may be made of an insulating material to insulate the first cooking chamber 21 and the second cooking chamber 22.

Therefore, the cooking chamber 20 may have a plurality of divided spaces that can be used in various ways according to the user's intention.

The drawings show an example in which the divider 23 divides the cooking chamber 20 into the two cooking chambers 21 and 22, however, the cooking chamber 20 may be divided into two or more cooking chambers.

A plurality of supports 24 may be disposed on both side walls in the cooking chamber 20 to support a plurality of racks 25 onto which cooking material is placed.

In the cooking chamber 20, a heater 26 may be installed for heating cooking material, and the heater 26 may be an electric heater including an electric resistor.

However, the heater 26 is not limited to the electric heater, and may be a gas heater that generates heat by burning gas.

Therefore, the oven may be an electric oven or a gas oven.

A first circulation fan 31 and a second circulation fan 33 may be disposed behind the first cooking chamber 21 and the second cooking chambers 22, respectively, to circulate air within the first and second cooking chambers 21 and 22. The first circulation fan 31 and the second circulation fan 33 may be driven by a first circulation motor (not shown) and a second circulation motor 35, respectively.

A fan cover 37 may be disposed in front of the first circulation fan 31 and the second circulation fan 33 to cover the first circulation fan 31 and the second circulation fan 33. The fan cover 37 may have a through-hole 39 through which air flows.

A rear panel 14 forms the rear surface of the main body 10 and includes an inflow hole 41 for enabling outside air to flow into at least one of the cooking chambers 21 and 22.

The inflow hole 41 may be formed adjacent to the first cooking chamber 21 to cause outside air to enter the first cooking chamber 21.

An inflow motor 43 may cause air to flow into the inflow hole 41.

The air that enters through the inflow hole 41 may flow into the first cooking chamber 21 through a guide bracket 49 that is coupled to the inflow motor 43.

The inflow motor 43 may be coupled to an inflow fan 47, and an inflow fan housing 45 may be coupled to the inflow fan 47.

In addition, one side of the inflow fan 47 may communicate with the guide bracket 49.

The guide bracket 49 may be coupled to a communicating hole (not shown) that communicates with the first cooking chamber 21. Accordingly, air that enters through the inflow fan 47 by operation of the inflow motor 43 may enter the first cooking chamber 21 through the guide bracket 49, thereby reducing temperature of the first cooking chamber 21.

That is, a flow passage through which air flows may be formed in the inside of the guide bracket 49.

Also, a discharge pipe (not shown) that is a flow passage through which a fluid can be discharged may be separately coupled to the rear panel 14 so that the air that enters the cooking chamber 20 can be discharged in correspondence to the amount of the air from the cooking chamber 20.

The discharge pipe (not shown) may be coupled to a discharge hole (not shown) that is positioned in at least a part of the main body 10.

The discharge hole (not shown) may be positioned in at least a part of the rear panel 14, and the air discharged through the discharge hole (not shown) may move along the discharge pipe (not shown).

Above the cooking chamber 20, a variety of electric parts (not shown) such as a circuit board are installed within the machine room 60. For example, a cooling fan unit 50 for cooling inside temperature of the machine room 60 may be installed in the machine room 60.

The cooling fan unit 50 may force outside air into the machine room 60 and then discharge the air in a front direction from the oven.

A shield frame 62 may be disposed between the second cooking chamber 22 and the machine room 60 to partition the machine room 60 from the second cooking chamber 22.

A first insulating material 71 may be disposed in a space between an upper portion of the second cooking chamber 22, a lower portion of the machine room 60, and the shield frame 62.

The first insulating material 71 may prevent heat that from the second cooking chamber 22 from flowing into the machine room 60.

In addition, a second insulating material 72 may be disposed between the main body 10 and rear portions of the first circulation fan 31 and the second circulation fan 33.

The second insulating material 72 may prevent heat from the first and second cooking chambers 21 and 22 from flowing to the environment outside of the main body 10.

The door 100 may be disposed on the front portion of the main body 10 to open or close the cooking chamber 20.

The door 100 may include a first door 110 rotatably coupled to the main body 10 to open or close the entire of the cooking chamber 20, and a second door 120 rotatably coupled to the first door 110 to open or close an opening 116 provided in the first door 110.

A door handle 101, which can be gripped by the user, may be disposed on a front upper portion of the second door 120, which is a front upper portion of the door 100. The door handle 101 may include a locking device 103 for fixing and/or releasing the door 100 from the main body 10 or fixing and/or releasing the second door 120 from the first door 110.

The first and second door frames 113 and 115 may be disposed on the rear surface of the door 100. On the first door frame 113, a latch member 114 may be provided to fix and/or release the second door 120 from the first door 110 by the locking device 103.

At a position of the front panel 11 corresponding to the latch member 114, when the door 100 is closed, a fixing groove 19 may be formed to cause the door 100 to be fixed to and released from the main body 10 by the latch member 114.

When the user grips the door handle 101 without operating the locking device 103, the locking device 103 may be fixed at the latch member 114, and the latch member 114 may be released from the fixing groove 19.

Therefore, when the user grips and pulls the door handle 101, the door 100 including the first door 110 and the second door 120 may open the entire cooking chamber 20.

When the user presses the locking device 103 while gripping the door handle 101, the locking device 103 may be released from the latch member 114, and the latch member 114 may be fixed at the fixing groove 19.

That is, when the user pulls the door handle 101 while gripping the door handle 101 and pressing the locking device 103, the first door 110 may be fixed at the main body 10, and the second door 120 may open because the second door 120 is unlocked from the first door 110.

The first door 110 may be rotatably coupled to the main body 10 by a first hinge unit 111, and the second door 120 may be rotatably coupled to the first door 110 by a second hinge unit 200.

Figure 5:
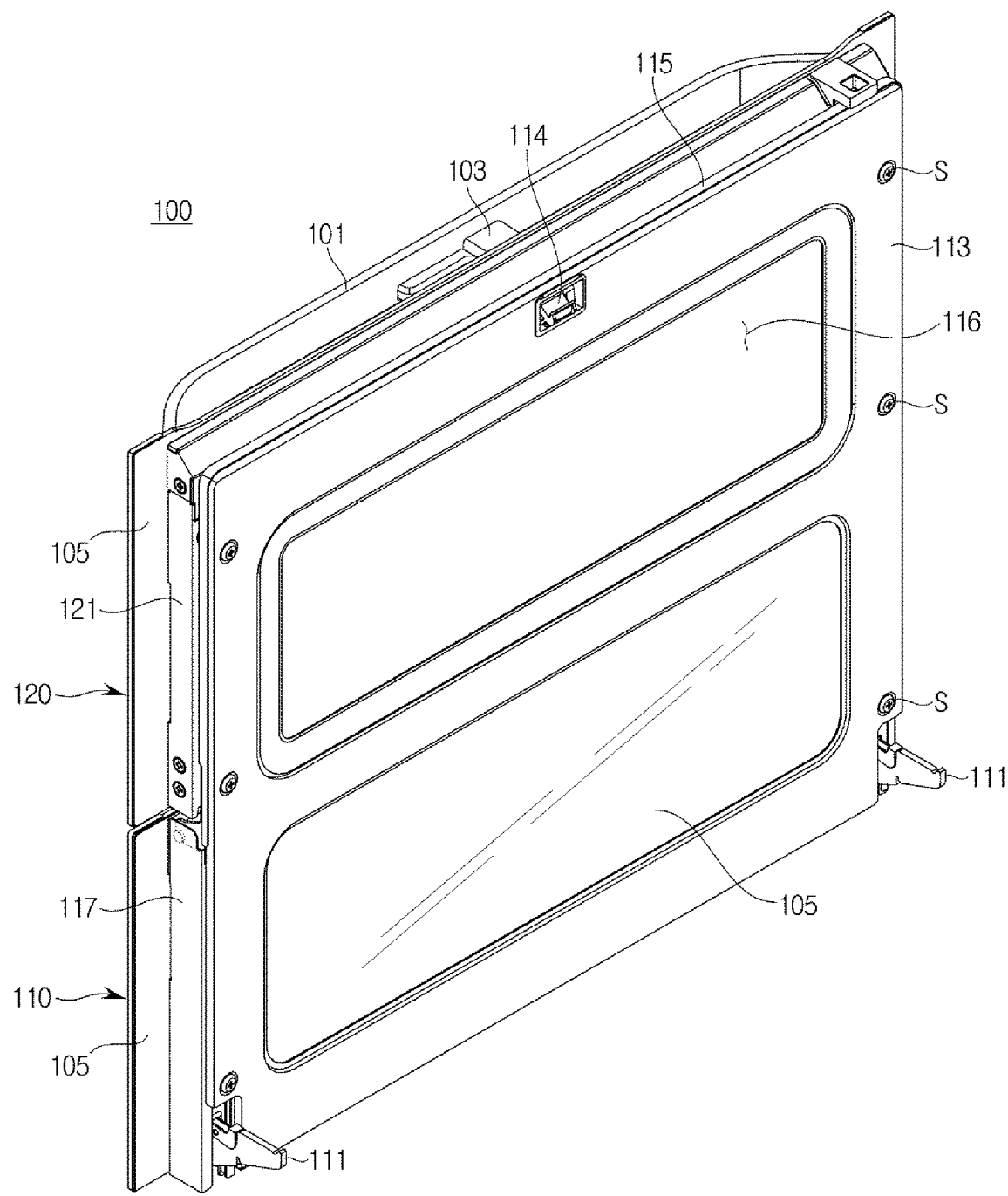
FIG. 5 is a perspective view illustrating a door of an oven according to an embodiment of the disclosure.
Figure 6:
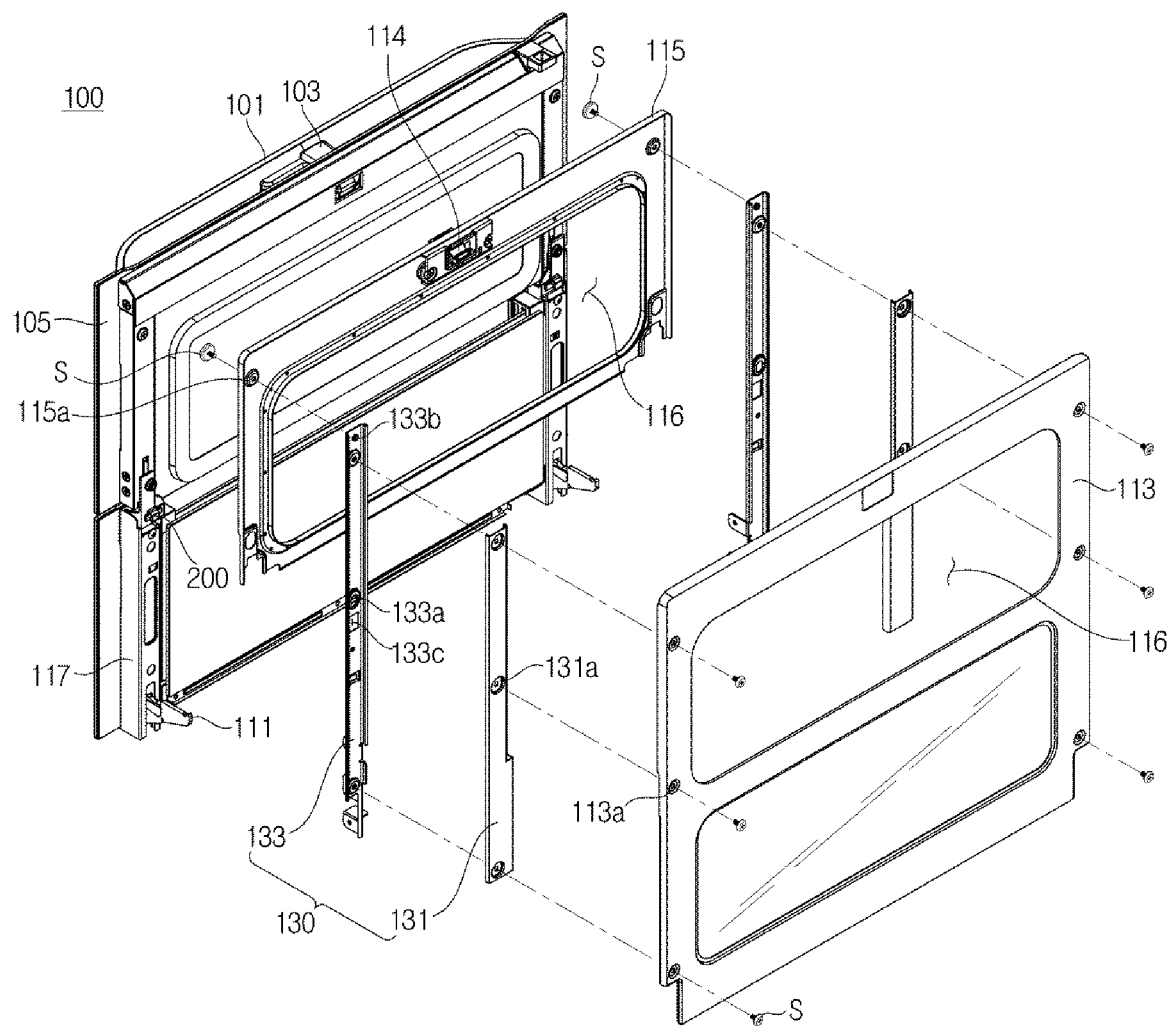
FIG. 6 is an exploded perspective view illustrating a door of an oven according to an embodiment of disclosure.
Figure 7:
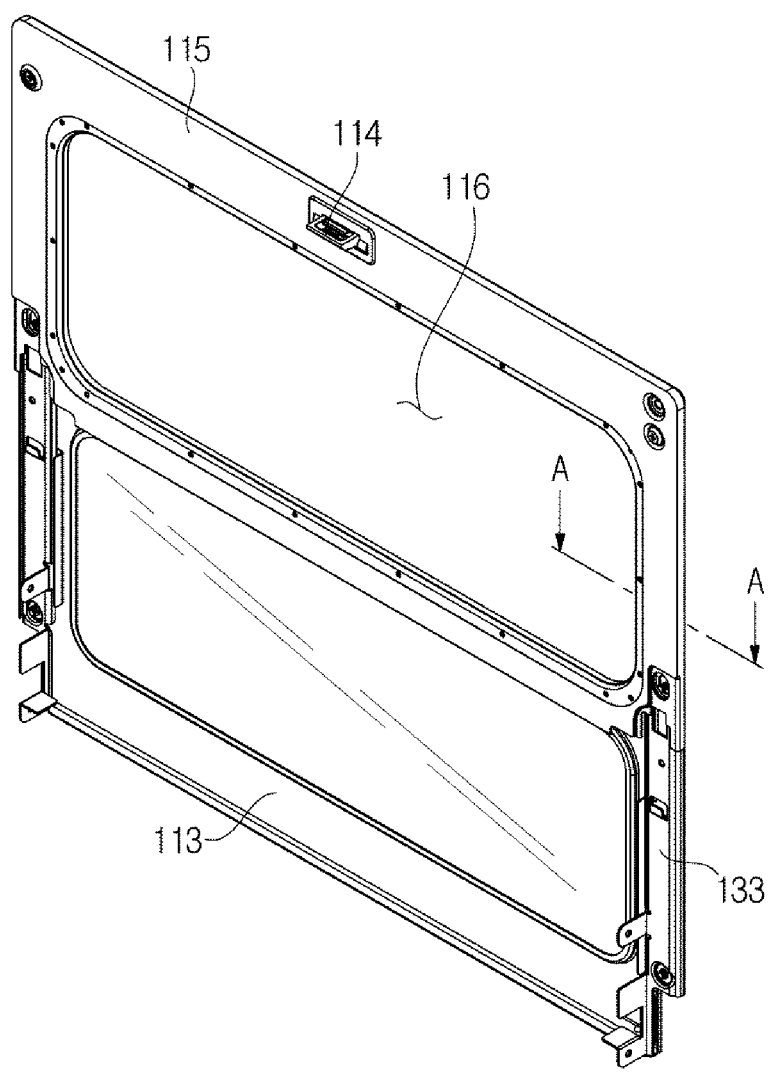
FIG. 7 is a view illustrating a reinforcing unit coupled to a door frame in an oven according to an embodiment of the disclosure.
Figure 8:
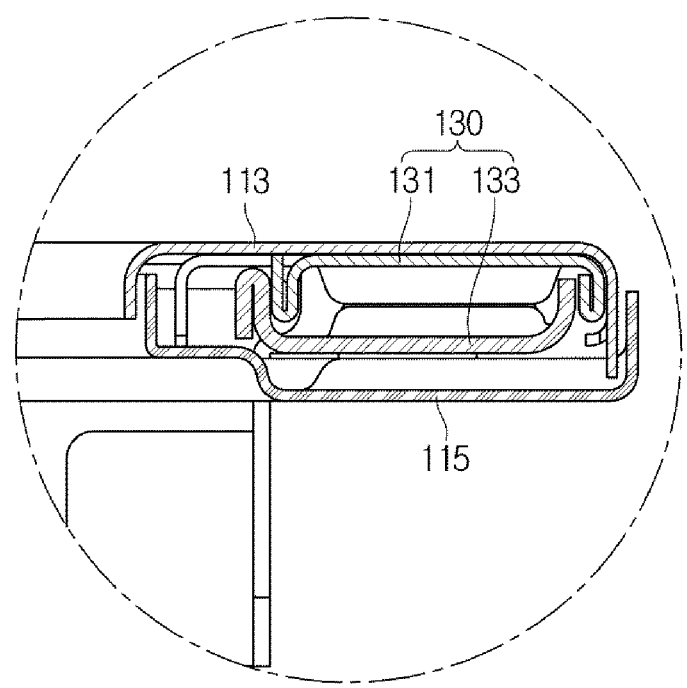
FIG. 8 is a cross-sectional view taken along line A-A of FIG. 7 according to an embodiment of the disclosure.

FIG. 5 is a perspective view of a door according to an embodiment of the disclosure, FIG. 6 is an exploded perspective view of a door according to an embodiment of the disclosure, FIG. 7 is a view illustrating a reinforcing unit coupled to a door frame according to an embodiment of the disclosure, and FIG. 8 is a cross-sectional view taken along line A-A of FIG. 7 according to an embodiment of the disclosure.

Referring to FIGS. 5, 6, 7, and 8, the door 100 may include the first door 110 and the second door 120.

The first door 110 may include the first and second door frames 113 and 115 disposed on the rear surface, and a pair of support frames 117 disposed on both sides to support the first door 110. The second door 120 may include a pair of support frames 121 disposed on both sides to support the second door 120.

The door frames 113 and 115 may include a first door frame 113 disposed to correspond to the entire rear surface of the door 100, and a second door frame 115 disposed to correspond to the rear surface of the second door 120 and coupled to the front surface of the first door frame 113.

Referring to FIG. 6, at positions of the door frames 113 and 115 corresponding to the second cooking chamber 22 located at an upper portion of the cooking chamber 20, the openings 116 may be formed to enable the user to put food or the like into the second cooking chamber 22 or take it out of the second cooking chamber 22 when the second door 120 is opened.

A plurality of glasses 105 may be fixed at the support frames 117 disposed on both sides of the first door 110 and the second door 120 to enable the user to look at the inside of the cooking chamber 20 from the outside when the door 100 is closed.

The door 100 may be supported by the support frames 117 and 121 at both sides. However, since the support frames 117 and 121 have a simple bending structure, the door 100 may be easily deformed.

At least one reinforcing unit 130 may be coupled to the door frames 113 and 115 to prevent deformation of the door 100.

A plurality of first fastening holes 113a may be formed in the first door frame 113 to couple the reinforcing unit 130 to the first door frame 113.

The reinforcing unit 130 may include a reinforcing bracket 131 and a reinforcing frame 133. The reinforcing bracket 131 and the reinforcing frame 133 may be bent to have a U-shaped cross-section.

The reinforcing bracket 131 may be coupled to the first door frame 113 by a screw S, and the reinforcing frame 133 may be coupled to the reinforcing bracket 131 by the screw S.

The reinforcing bracket 131 and the reinforcing frame 133 may include a plurality of second fastening holes 131a and a plurality of third fastening holes 133a that correspond to the plurality of first fastening holes 113a formed in the first door frame 113, respectively.

The reinforcing bracket 131 and the reinforcing frame 133 may extend in a vertical direction of the door 100, and be coupled to the first door frame 113 at positions that corresponding to the support frames 117 and 121.

The second door frame 115 and the reinforcing frame 133 may have a plurality of first assembly holes 115a and a plurality of second assembly holes 133b, respectively, for assembling the door 100.

Since the reinforcing unit 130 is coupled to the door frames 113 and 115, the door 100 may be supported by the support frames 117 and 121 and the reinforcing unit 130 so that deformation of the door 100 can be prevented.

Figure 9:
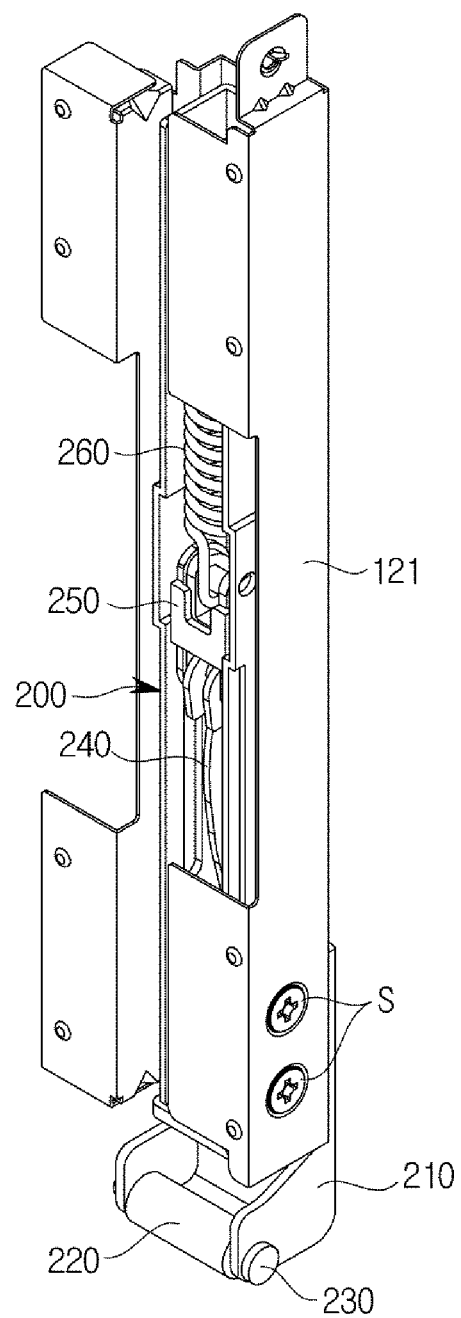
FIG. 9 is a view illustrating a second hinge unit coupled to a support frame in an oven according to an embodiment of the disclosure.
Figure 10:
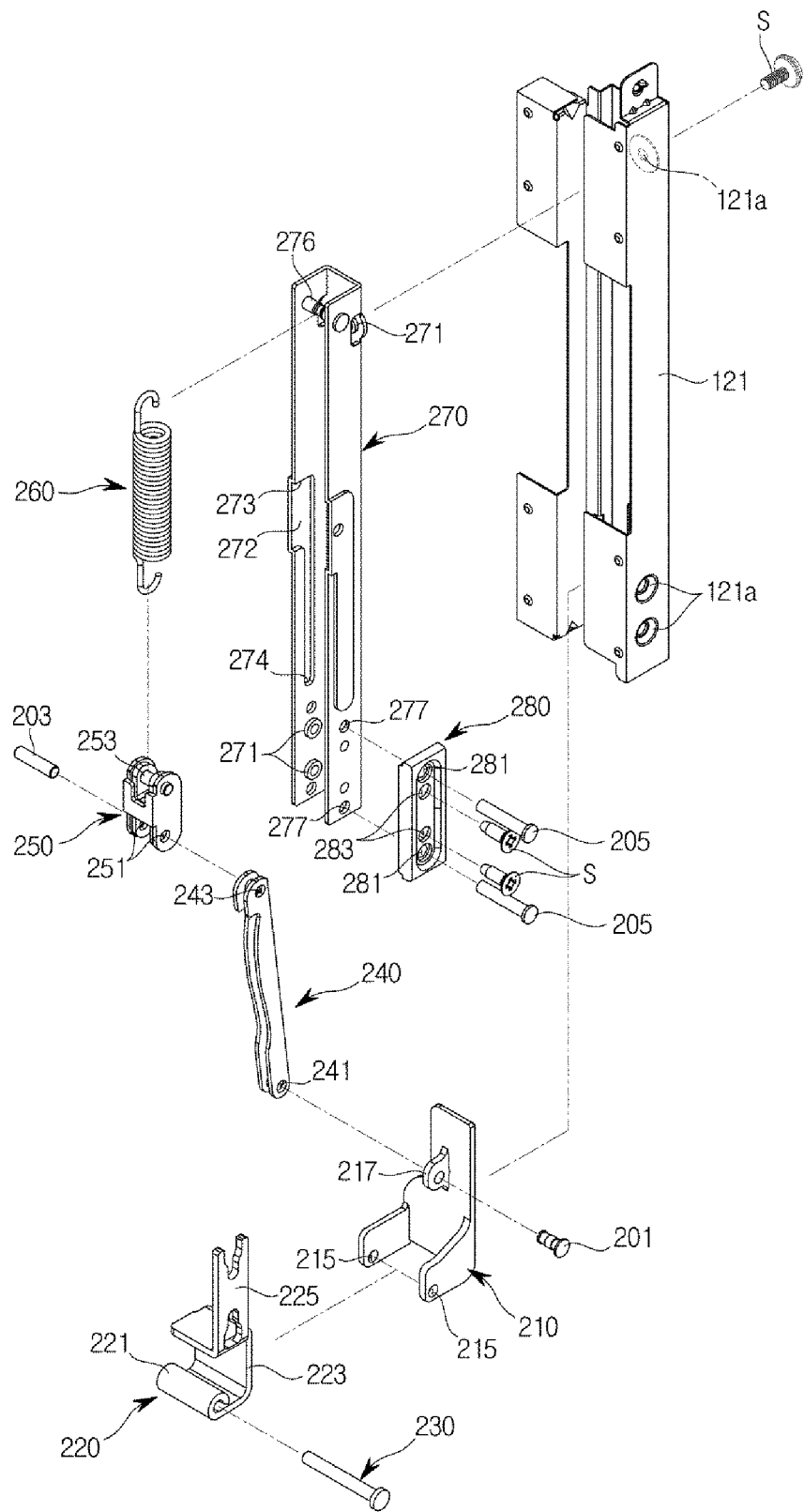
FIG. 10 is an exploded view of a second hinge unit coupled to a support frame in an oven according to an embodiment of the disclosure.
Figure 11:
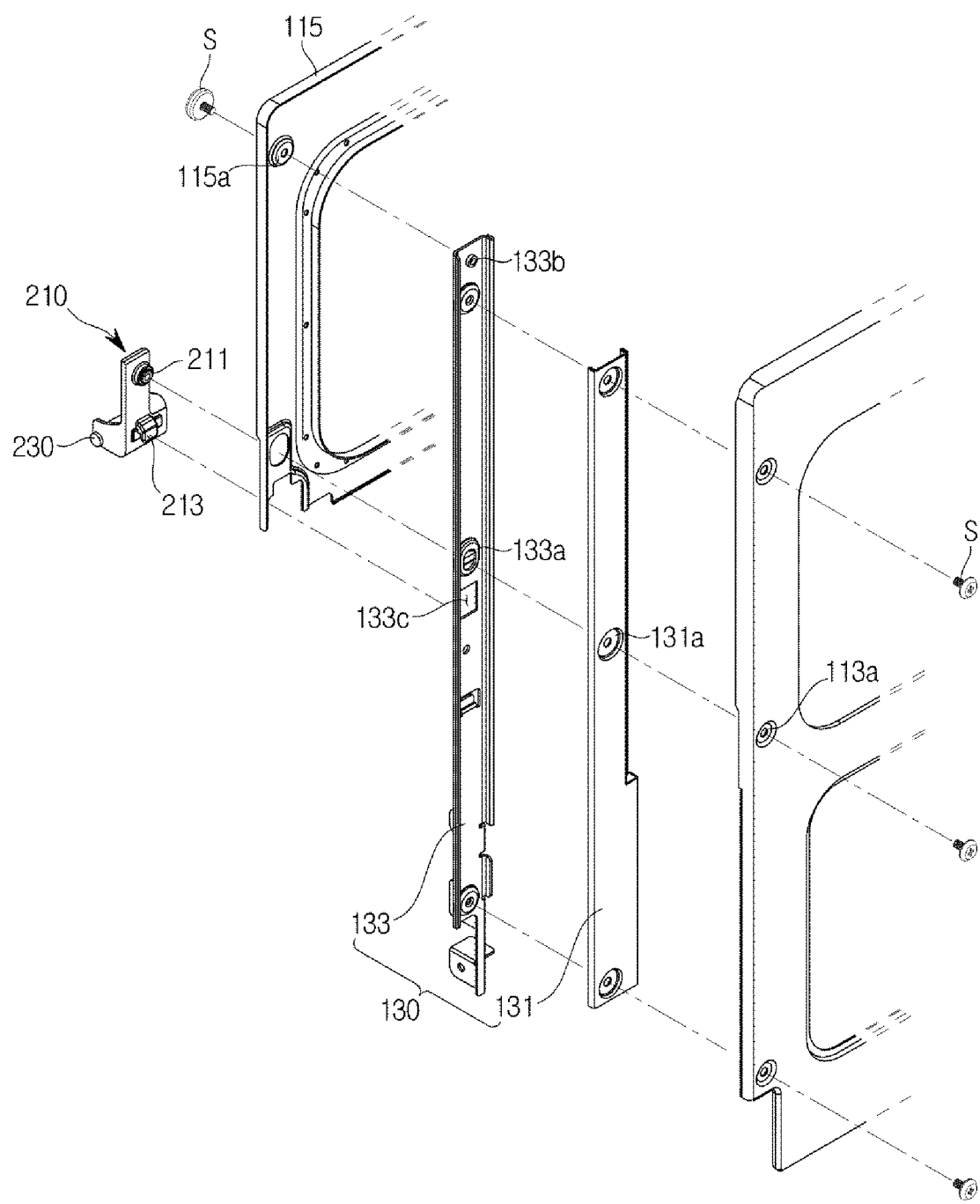
FIG. 11 is a view illustrating a hinge holder coupled to a door frame and a reinforcing unit in an oven according to an embodiment of the disclosure.
Figure 12:
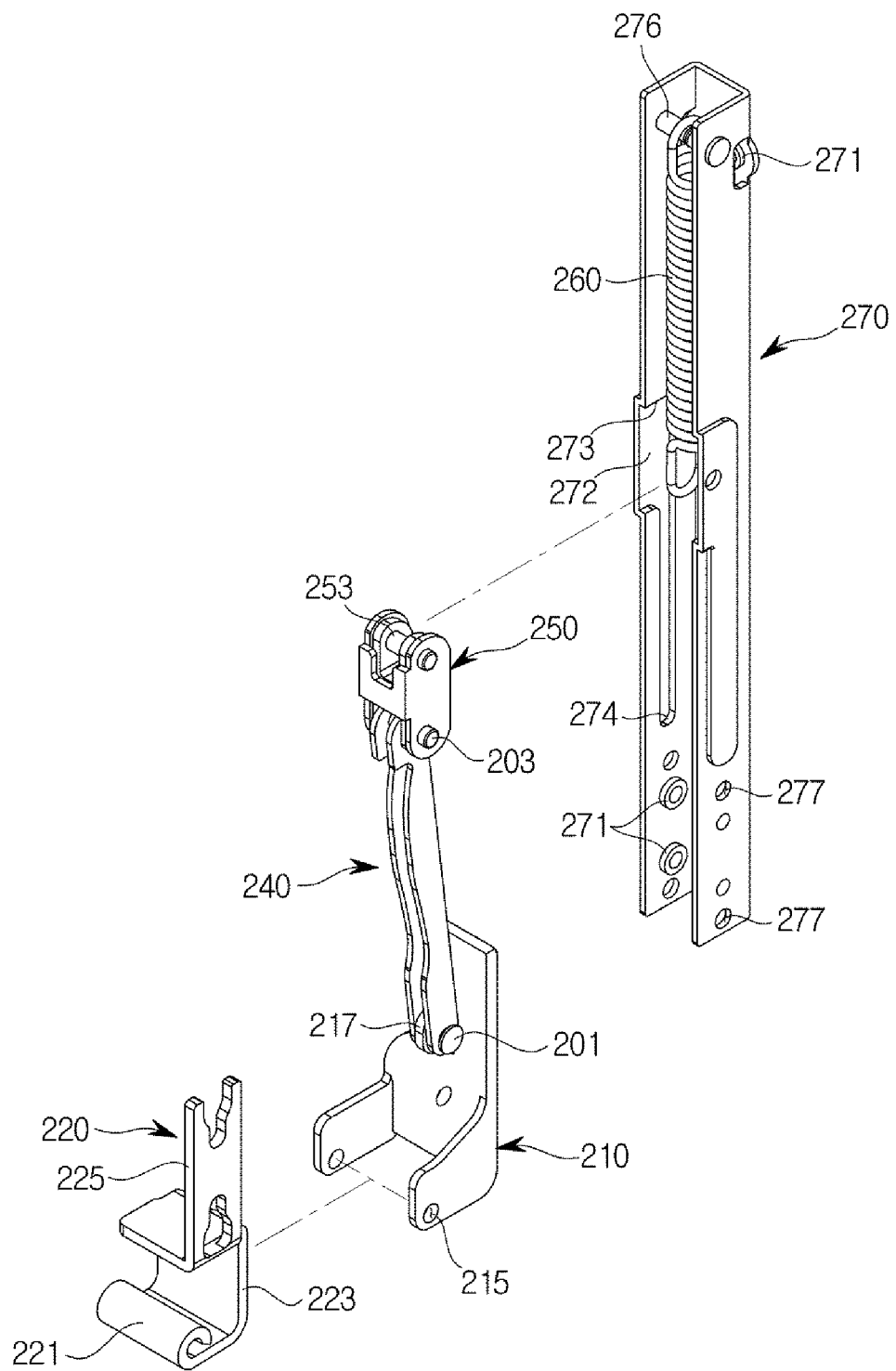
FIG. 12 is an exploded view illustrating a part of a second hinge unit in an oven according to an embodiment of the disclosure.
Figure 13:
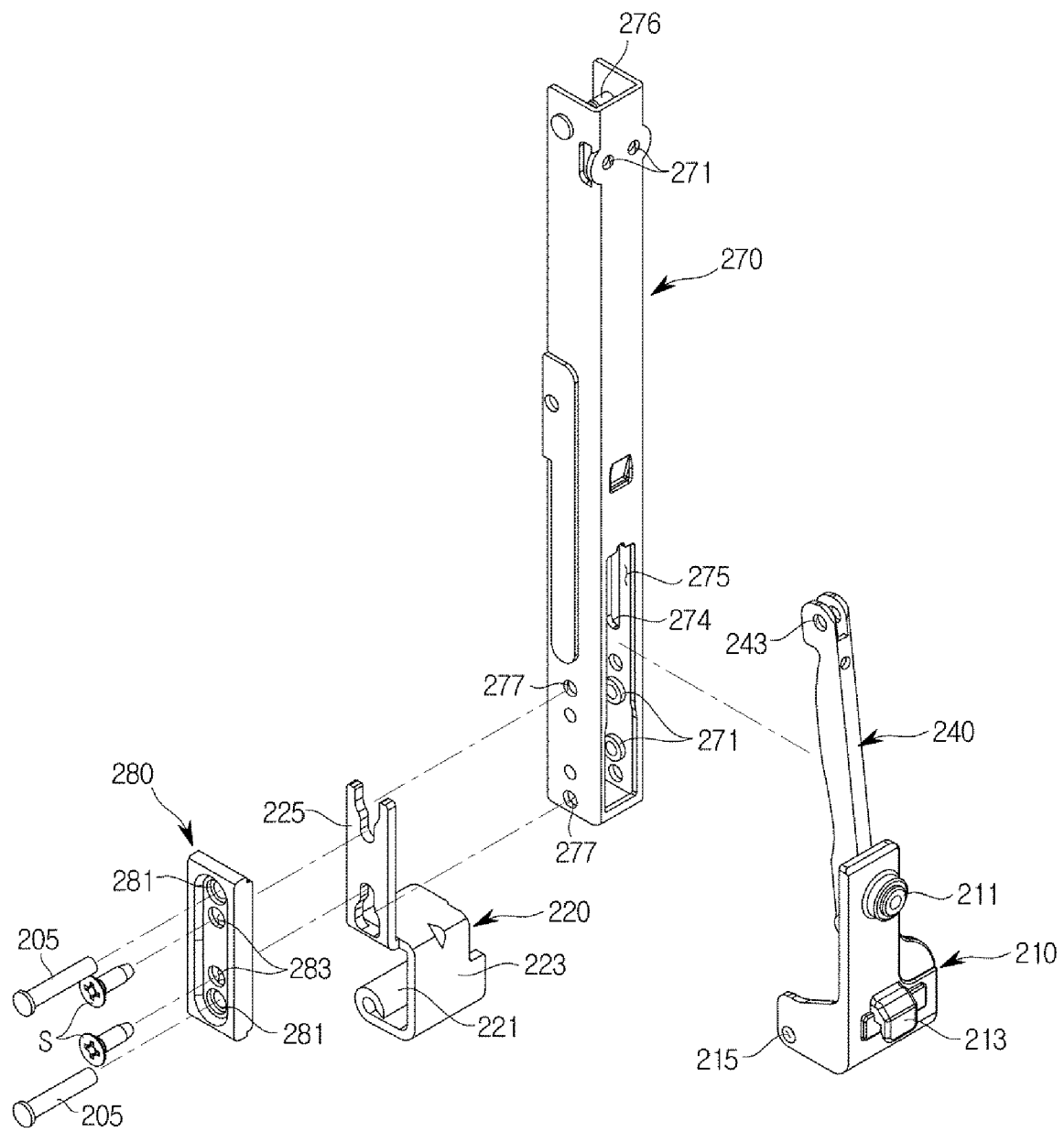
FIG. 13 is an exploded view illustrating a part of a second hinge unit at different angles in an oven according to an embodiment of the disclosure.
Figure 14:
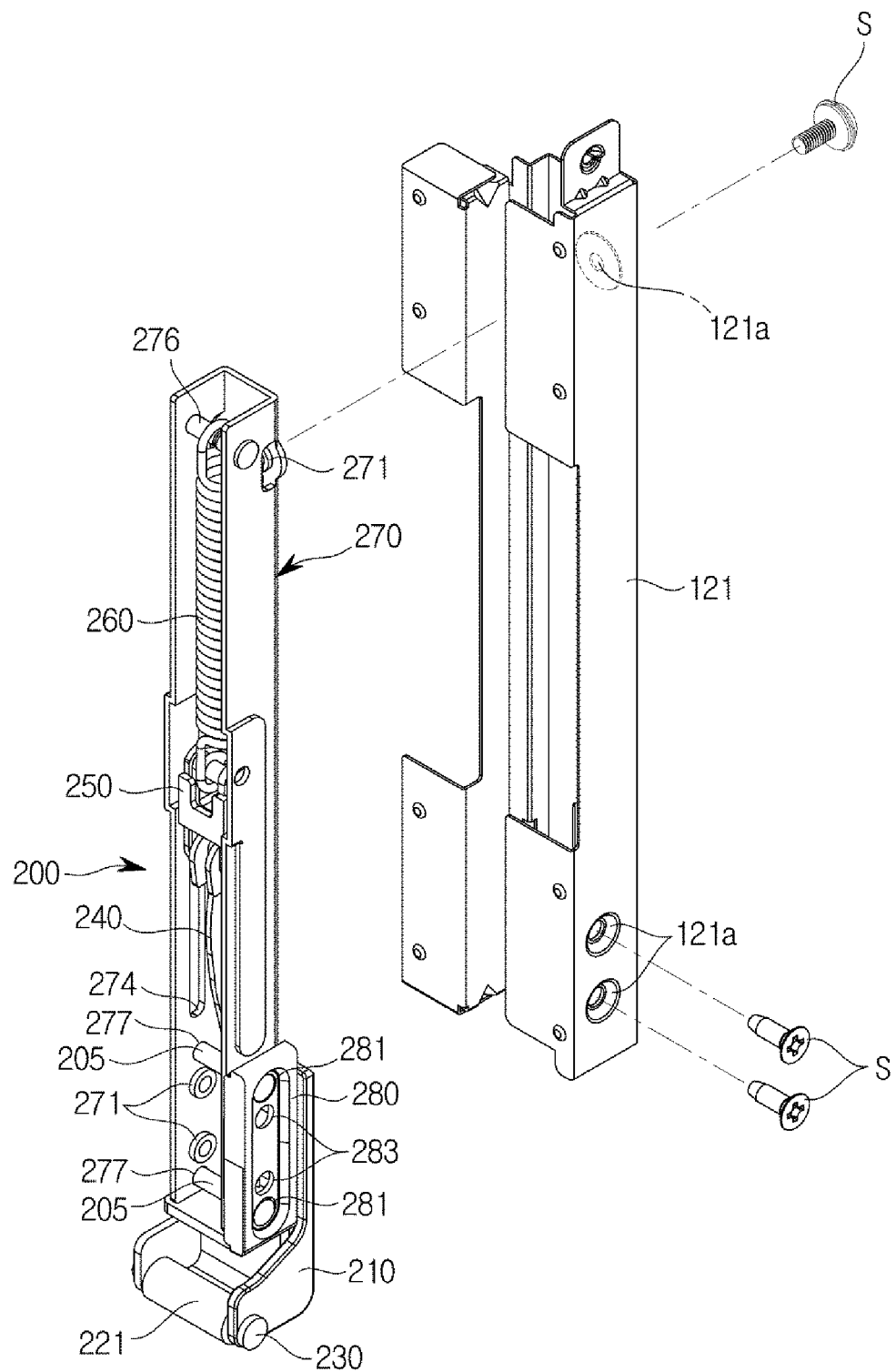
FIG. 14 is a view illustrating a second hinge unit and a support frame in an oven according to an embodiment of the disclosure.

FIG. 9 is a view illustrating a second hinge unit according to an embodiment of the disclosure, FIG. 10 is an exploded perspective view of a second hinge unit coupled to a support frame according to an embodiment of the disclosure, FIG. 11 is a view for illustrating a hinge holder coupled to a door frame according to an embodiment of the disclosure, FIG. 12 is an exploded perspective view illustrating a part of a second hinge unit according to an embodiment of the disclosure, FIG. 13 is an exploded perspective view illustrating a part of a second hinge unit at different angles in an oven according to an embodiment of the disclosure shown at another angle, and FIG. 14 is a view illustrating a second hinge unit and a support frame in an oven according to an embodiment of the disclosure.

Referring to FIGS. 9, 10, 11, 12, 13, and 14, the second hinge unit 200 may include a hinge holder 210 coupled to the door frames 113 and 115, a hinge frame 270 coupled to the second door 120, a hinge link 220 for rotatably connecting the hinge frame 270 to the hinge holder 210, and a hinge shaft 230 for rotatably coupling the hinge link 220 to the hinge holder 210.

The second hinge unit 200 may further include a support rod 240 for supporting weight of the second door 120 when the second door 120 is opened or closed, an elastic member 260 for generating an elastic force when the second door 120 is opened and providing the elastic force in a direction in which the second door 120 is closed, and a slider 250 for connecting the elastic member 260 to the support rod 240.

The hinge holder 210 may include a door frame coupling hole 211 coupled to the door frames 113 and 115, a fixing hook 213 fixed to the reinforcing unit 130, a hinge hole 215 to which the hinge shaft 230 is rotatably coupled, and a first rotation hole 217 to which one end of the support rod 240 is rotatably coupled.

The door frame coupling hole 211 may be disposed to correspond to one of the plurality of fastening holes provided in the door frames 113 and 115, the reinforcing bracket 131 and the reinforcing frame 133, so that the hinge holder 210 is coupled to the door frames 113 and 115 by the screw S.

The fixing hook 213 may be inserted into a fixing hole 133c provided in the reinforcing frame 133, and fixed in the fixing hole 133c.

The hinge shaft 230 rotatably coupled to the hinge hole 215 may be positioned behind the front surface of the first door 110 and below a lower end of the second door 120 (see FIG. 4).

The hinge shaft 230 may be positioned below the divider 23 dividing the cooking chamber 20 into the first cooking chamber 21 and the second cooking chamber 22 (see FIG. 3).

The hinge link 220 may include a hinge portion 221 coupled to the hinge shaft 230 to rotate together with the hinge shaft 230, a hinge frame fixing portion 225 fixed to the hinge frame 270, and a link portion 223 for connecting the hinge portion 221 to the hinge frame fixing portion 225.

The hinge frame 270 may rotate together with the hinge link 220 since the hinge link 220 rotate together with the hinge shaft 230, which is fixed to the hinge frame 270.

The link portion 223 may be bent to have a U-shape in order to prevent interference with the first door 110 when the second door 120 rotates.

Although the link portion 223 bent to a U-shape is shown in the drawings, the shape of the link portion 223 is not limited to this. That is, the link portion 223 may have another shape to prevent interference with the first door 110 when the second door 120 rotates.

The support rod 240 may support weight of the second door 120 when the second door 120 is opened or closed. The support rod 240 may include a second rotation hole 241 formed at one end of the support rod 240 and rotatably coupled to the first rotation hole 217 of the hinge holder 210 by a rotation shaft 201, and a slider connection hole 243 formed at the other end of the support rod 240 and connected to the slider 250 by a connection member 203.

The slider 250 may include a support rod connection hole 251 connected to the slider connection hole 243 of the support rod 240 by the connection member 203, and a first fixing bar 253 at which one end of the elastic member 260 is fixed.

When the second door 120 is opened or closed, the slider 250 may move along a guide rail 272 provided on the hinge frame 270, which will be described below.

One end of the elastic member 260 may be fixed to the first fixing bar 253 of the slider 250, and another end of the elastic member 260 may be fixed to a second fixing bar 276 of the hinge frame 270. Accordingly, the elastic member 260 may accumulate an elastic force when the second door 120 is opened, and when the second door 120 is closed, the elastic member 260 may provide the accumulated elastic force in a direction in which the second door 120 is closed so that the second door 120 can be easily closed.

The hinge frame 270 may include a plurality of support frame coupling holes 271 through which the hinge frame 270 is coupled to the support frames 121 disposed on both sides of the second door 120, a guide rail 272 for guiding a movement of the slider 250, a guide hole 275 for guiding the support rod 240, and a second fixing bar 276 at which the other end of the elastic member 260 is fixed.

The guide rail 272 may include a first stopper 273 disposed at one end of the guide rail 272 to restrict the movement of the slider 250 when the second door 120 is closed, and a second stopper 274 disposed at the other end of the guide rail 272 to restrict a movement of the slider 250 when the second door 120 is opened.

The coupling bracket 280 may include a hinge link fixing hole 281 through which the coupling bracket 280 is fixed to the hinge frame fixing portion 225 of the hinge link 220 by the fixing member 205, and a coupling hole 283 through which the coupling bracket 280 is coupled to the support frame 121 and the hinge frame 270.

The hinge frame 270 may include a coupling bracket fixing hole 277 at which the coupling bracket 280 is fixed by the fixing member 205. It may be possible to fix the coupling bracket 280 at which the hinge link 220 is fixed to the hinge frame 270 by corresponding the position of the hinge link fixing hole 281 of the coupling bracket 280 to the position of the coupling bracket fixing hole 277.

After the hinge link 220 is fixed to the hinge frame 270 by the coupling bracket 280, the hinge frame 270 may be coupled to the support frame 121 by the screw S using a coupling hole 121a.

Hereinafter, an operation in which the second door 120 is opened by the second hinge unit 200 will be described below with reference to FIGS. 15, 16, 17, and 18.

Figure 15:
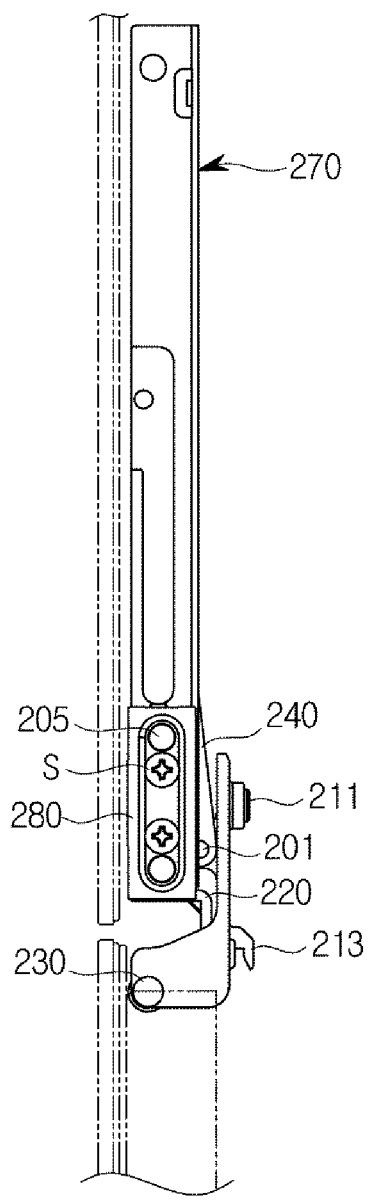
FIG. 15 is a side view illustrating a second hinge unit when a second door is closed in an oven according to an embodiment of the disclosure.
Figure 16:
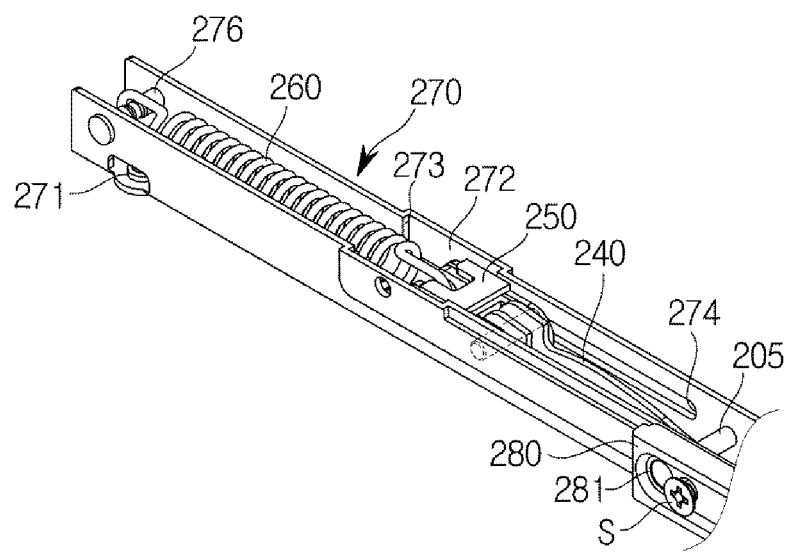
FIG. 16 is a view illustrating an inside of a second hinge unit when a second door is closed in an oven according to an embodiment of the disclosure.
Figure 17:
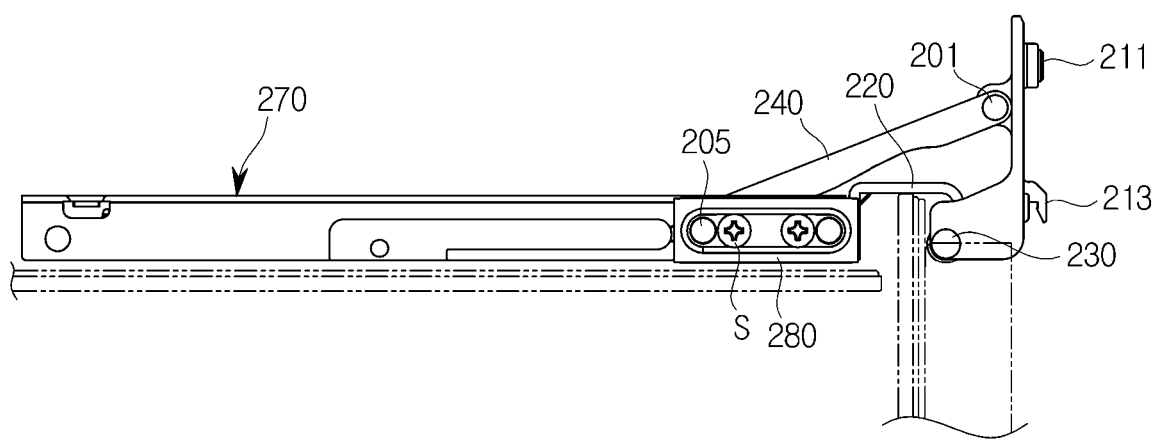
FIG. 17 is a side view illustrating a second hinge unit when a second door is opened in an oven according to an embodiment of the disclosure.
Figure 18:
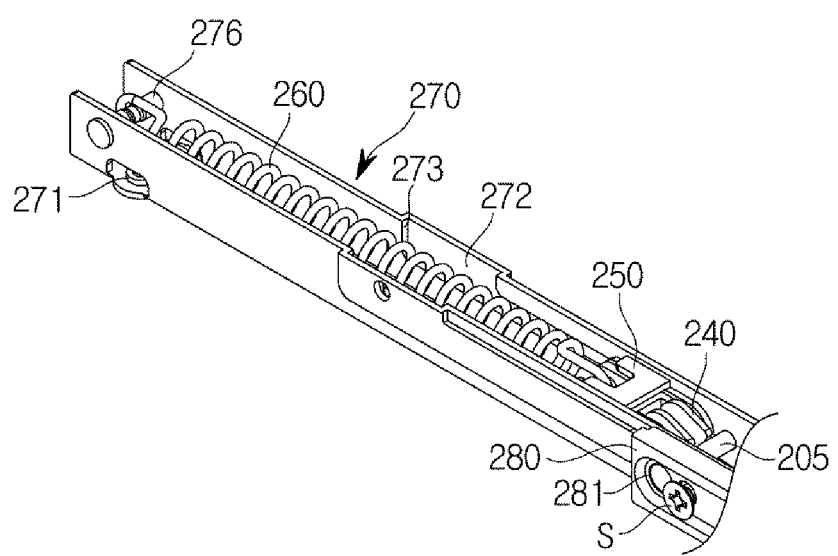
FIG. 18 is a view illustrating an inside of a second hinge unit when a second door is opened in an oven according to an embodiment of the disclosure.

FIG. 15 is a side view of a second hinge unit when a second door is closed in an oven according to an embodiment of the disclosure, FIG. 16 is a view illustrating an inside of a second hinge unit when a second door is closed in an oven according to an embodiment of the disclosure, FIG. 17 is a side view of a second hinge unit when a second door is opened in an oven according to an embodiment of the disclosure, and FIG. 18 is a view illustrating an inside of a second hinge unit when a second door is opened in an oven according to an embodiment of the disclosure.

Referring to FIGS. 15 and 16, when the second door 120 is closed, the slider 250 may be located at a position where a movement of the slider 250 is restricted by the first stopper 273 of the guide rail 272.

Referring to FIGS. 17 and 18, when the second door 120 rotates to open, the hinge link 220 and the hinge frame 270 may move in a direction in which the second door 120 is opened, together with the hinge shaft 230.

At this time, the support rod 240 may be guided along the guide hole 275 of the hinge frame 270, and rotate on the rotation shaft 201 in the direction in which the second door 120 is opened.

When the support rod 240 rotates on the rotation shaft 201, the slider 250 may move from the first stopper 273 to the second stopper 274 along the guide rail 272.

When the slider 250 moves, the elastic member 260 may accumulate an elastic force, and when the movement of the slider 250 is restricted by the second stopper 274, the second door 120 may stop rotating.

The second door 120 may be opened without interference with the first door 110 since the link portion 223 of the hinge link 220 includes the U-shape.

Since the hinge shaft 230, which is the center of rotation of the second door 120, is positioned behind the front surface of the first door 110 and below the lower end of the second door 120, the opening angle of the second door 120 may be maximized.

When the second door 120 rotates to be closed as shown in FIGS. 15 and 16 from the open state as shown in FIGS. 17 and 18, the hinge link 220 and the hinge frame 270 may rotate in the direction in which the second door 120 is closed, together with the hinge shaft 230.

At this time, the support rod 240 may be guided along the guide hole 275 of the hinge frame 270, and rotate on the rotation shaft 201 in the direction in which the second door 120 is closed.

When the support rod 240 rotates on the rotation shaft 201, the slider 250 may move from the second stopper 274 to the first stopper 273 along the guide rail 272.

An elastic force accumulated in the elastic member 260 by the movement of the slider 250 may be provided in the direction in which the second door 120 is closed so that the second door 120 can be easily closed even with a small force.

Figure 19:
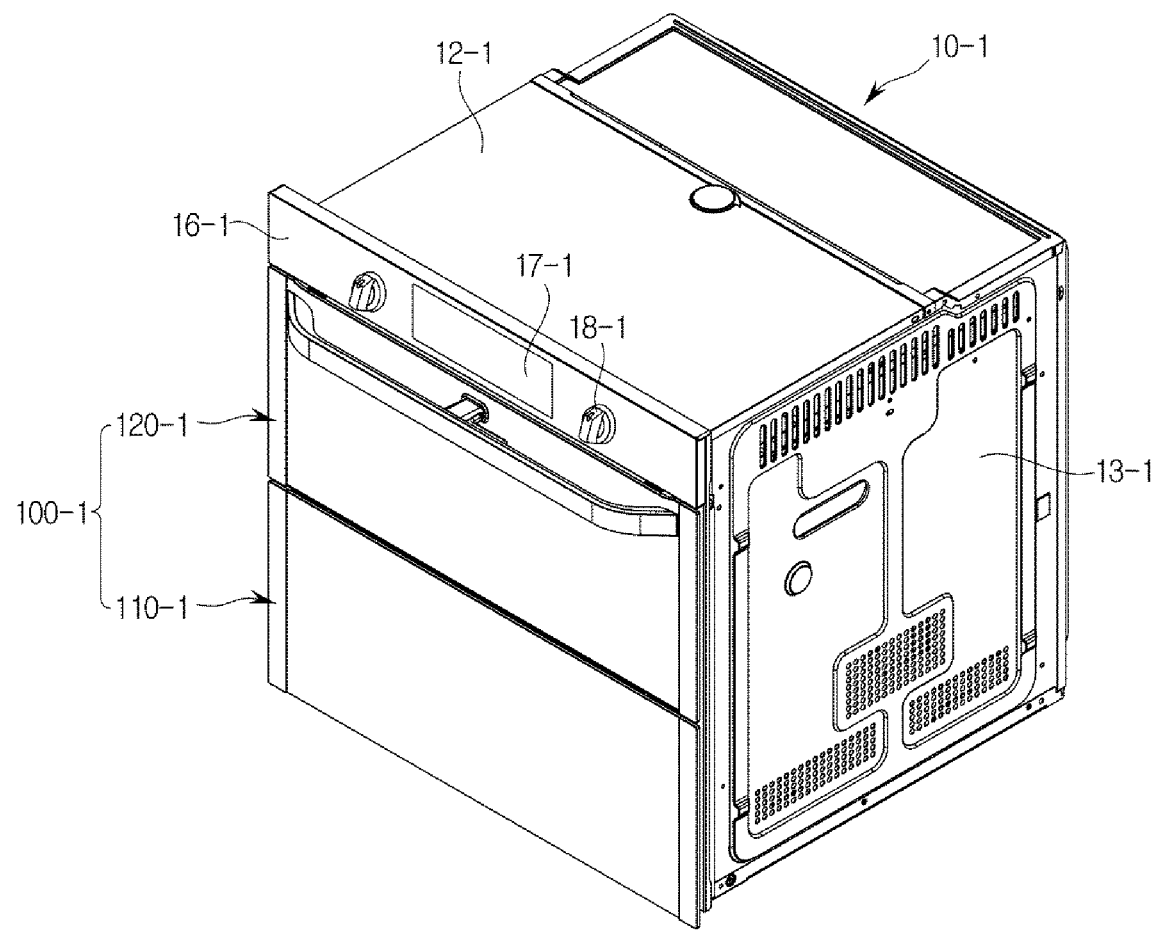
FIG. 19 is a perspective view illustrating an oven according to an embodiment of the disclosure.
Figure 20:
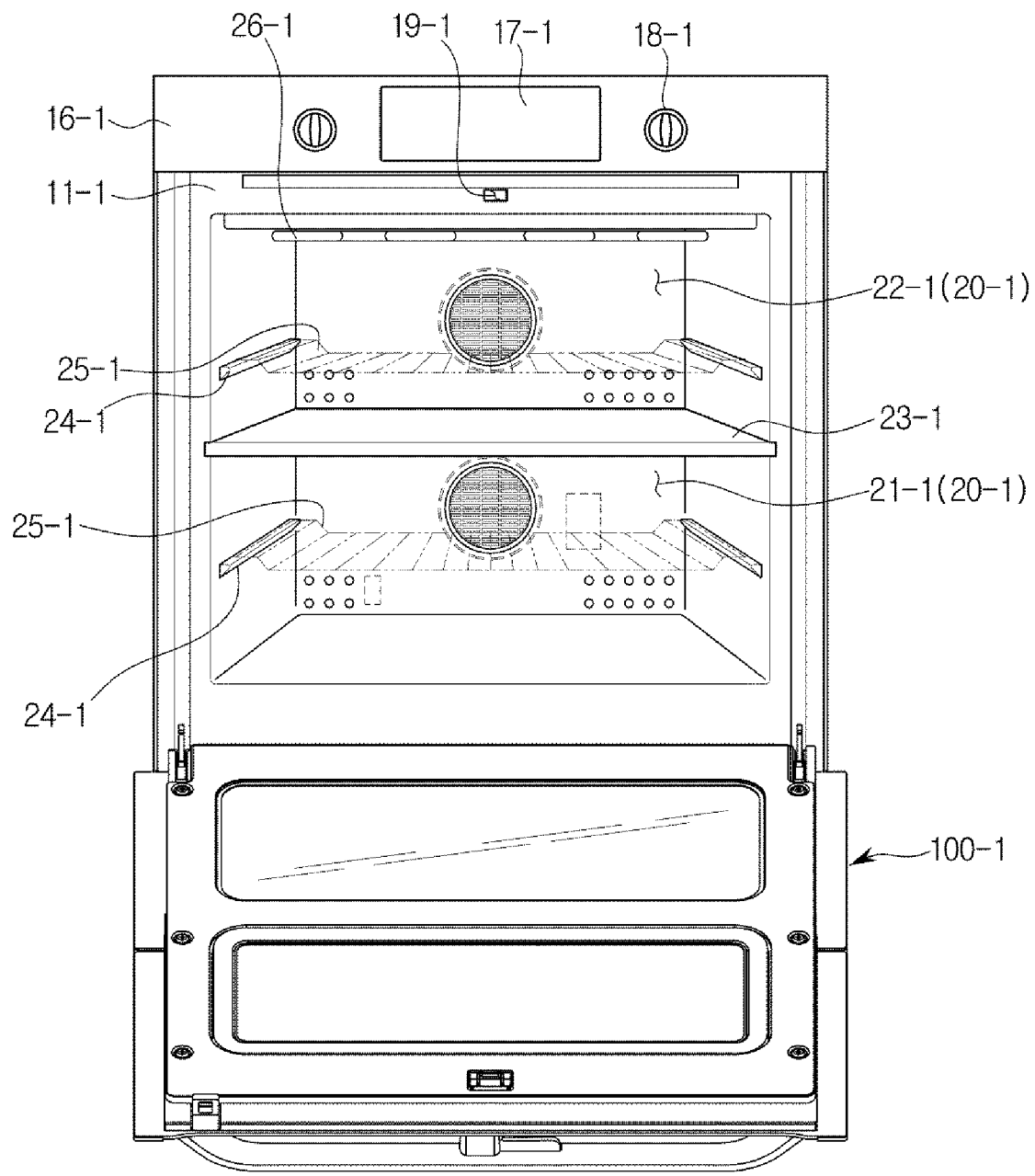
FIG. 20 is a view illustrating a state in which a door of an oven is open according to an embodiment of the disclosure.

FIG. 19 is a perspective view of an oven according to an embodiment of the disclosure, and FIG. 20 shows a state in which a door of an oven is open according to an embodiment of the disclosure.

Referring to FIGS. 19 and 20, an oven may include a main body 10-1, a cooking chamber 20-1 which is formed in the inside of the main body 10-1 whose front portion opens, and a door 100-1 disposed on a front portion of the main body 10-1 to open or close the cooking chamber 20-1.

The main body 10-1 may include a front panel 11-1 forming a front outer surface of the oven, an upper panel 12-1 forming an upper surface of the oven, a pair of side panels 13-1 forming side surfaces of the oven, a rear panel (not shown) forming a rear surface of the oven, and a lower panel (not shown) forming a lower surface of the oven.

In a front upper portion of the front panel 11-1, a machine room cover 16-1 covering a front portion of a machine room (not shown) may be provided. The machine room cover 16-1 may be provided with a display 17-1 for displaying various operation information of the oven, a control panel 18-1 for enabling a user to operate the oven, and a fixing groove 19-1 for latching the door 100-1.

The cooking chamber 20-1 may be formed in the shape of a box in the inside of the main body 10-1, and the user may insert and remove cooking material into the cooking chamber 20-1 through the open front portion of the cooking chamber 20.

The cooking chamber 20-1 may be include a divider 23-1 to divide the cooking chamber 20-1 into a first cooking chamber 21-1 and a second cooking chamber 22-1 that is disposed above the first cooking chamber 21-1.

The first and second cooking chambers 21-1 and 22-1 may have different sizes. The divider 23-1 may be made of an insulating material to insulate the first cooking chamber 21-1 and the second cooking chamber 22-1.

Therefore, the cooking chamber 20-1 may have a plurality of divided spaces that can be used in various ways according to the user's intention.

Although FIG. 19 illustrates an example in which the cooking chamber 20-1 is divided into the two cooking chambers 21-1 and 22-1 by the divider 23-1, however, the cooking chamber 20-1 may be divided into two or more cooking chambers.

A plurality of supports 24-1 may be disposed on both side walls in the cooking chamber 20-1 to support a plurality of racks 25-1 on which cooking material is placed.

In the cooking chamber 20-1, a heater 26-1 may be installed for heating cooking material, and the heater 26-1 may be an electric heater including an electric resistor.

However, the heater 26-1 is not limited to the electric heater, and may be a gas heater that generates heat by burning gas.

Therefore, the oven may be an electric oven or a gas oven.

The oven shown in FIGS. 19 and 20 may have the same structure as the oven described above with reference FIGS. 1 to 18, although the oven shown in FIGS. 19 and 20 the door 100-1 may include a first door 110-1 and a second door 120-1.

The reinforcing unit 130 and the second hinge unit 200 applied to the door 100 of the oven shown in FIGS. 1 to 18 may also be applied in the same way to the door 100-1 of the oven shown in FIGS. 19 and 20. Therefore, detailed descriptions about the reinforcing unit 130 and the second hinge unit 200 will be omitted.

As is apparent from the above description, according to various embodiments of the disclosure, it may be possible to prevent deformation of the door.

Also, by improving the hinge structure of the door capable of opening or closing a part of the cooking chamber, the area of a part of the cooking chamber being opened and closed by the door may be maximized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An oven comprising:
    a main body;
    a cooking chamber inside of the main body;
    a first door rotatably coupled to the main body by a first hinge unit to open or close the cooking chamber, and including a door frame disposed to a rear portion of the first door;
    at least one reinforcing unit coupled to the door frame, and positioned between a front portion of the first door and the door frame to prevent deformation of the first door;
    a second door rotatably coupled to the first door, and configured to open or close an opening of the door frame; and
    a second hinge unit configured to enable the second door to be rotatably coupled to the first door, the second hinge unit including a hinge shaft positioned behind a front surface of the first door and below a lower end of the second door.

2. The oven of claim 1, further comprising:
    a divider configured to divide the cooking chamber into a first cooking chamber and a second cooking chamber,
    wherein the first cooking chamber is disposed in a lower portion of the cooking chamber and the second cooking chamber is disposed in an upper portion of the cooking chamber,
    wherein the opening is disposed at a position corresponding to the second cooking chamber, and
    wherein the hinge shaft is positioned below a lower end of the divider.

3. The oven of claim 1, wherein the second hinge unit further comprises:
    a hinge holder coupled to the door frame;
    a hinge frame coupled to the second door; and
    a hinge link configured to enable the hinge frame to be rotatably connected to the hinge holder.

4. The oven of claim 3, wherein the hinge link comprises:
    a hinge portion coupled to the hinge shaft and configured to rotate together with the hinge shaft;
    a hinge frame fixing portion fixed to the hinge frame; and
    a link portion connecting the hinge portion to the hinge frame fixing portion and having a U-shape.

5. The oven of claim 4,
    wherein the hinge frame and the hinge link rotate on the hinge shaft when the second door is opened or closed, and
    wherein the U-shape prevents interference with the first door when the second door is opened or closed.

6. An oven comprising:
    a main body;
    a cooking chamber inside of the main body and including a divider configured to divide the cooking chamber into a first cooking chamber and a second cooking chamber, the first cooking chamber being disposed in a lower portion of the cooking chamber and the second cooking chamber being disposed in an upper portion of the cooking chamber;
    a first door rotatably coupled to the main body by a first hinge unit, and configured to open or close the cooking chamber, the first door including a door frame having an opening at a position corresponding to the second cooking chamber;
    a second door rotatably coupled to the first door, and configured to open or close the opening; and
    a second hinge unit configured to rotatably couple the second door to the first door, the second hinge unit including a hinge shaft positioned behind a front surface of the first door and below a lower end of the divider.

7. The oven of claim 6, wherein the second hinge unit further including:
    a hinge holder coupled to the door frame;
    a hinge frame coupled to the second door; and
    a hinge link configured to enable the hinge frame to be rotatably connected to the hinge holder.

8. The oven of claim 7, wherein the second hinge unit further including a support rod configured to support a weight of the second door when the second door is opened or closed.

9. The oven of claim 8, wherein the hinge holder comprises:
    a door frame coupling hole coupled to the door frame;
    a fixing hook fixed to a reinforcing unit;
    a hinge hole to which the hinge shaft is rotatably coupled; and
    a first rotation hole to which a first end of the support rod is rotatably coupled.

10. The oven of claim 9, wherein the second hinge unit further comprises:
    an elastic member accommodated in the hinge frame, and configured to:
        generate an elastic force when the second door is opened and,
        when the second door is closed, provide the elastic force in a direction in which the second door is closed; and
    a slider connecting the elastic member and the support rod.

11. The oven of claim 10, wherein the hinge link comprises:
    a hinge portion coupled to the hinge shaft and rotatable together with the hinge shaft;
    a hinge frame fixing portion fixed to the hinge frame; and
    a link portion connecting the hinge portion to the hinge frame fixing portion and having a U-shape.

12. The oven of claim 11,
    wherein a coupling bracket is fixed to the hinge frame fixing portion by a fixing member, and
    wherein the hinge frame is coupled to the coupling bracket such that the hinge frame fixing portion is fixed to the hinge frame.

13. The oven of claim 12, wherein the coupling bracket comprises:
    a hinge link fixing hole fixed to the hinge frame fixing portion by the fixing member; and
    a coupling hole to which the hinge frame is coupled.

14. The oven of claim 13, wherein the support rod comprises:
- a second rotation hole formed at the first end of the support rod and rotatably coupled to the first rotation hole by a rotation shaft, and
- a slider connection hole formed at a second end of the support rod and connected to the slider by a connection member.

15. The oven of claim 14, wherein the slider comprises:
- a support rod connection hole connected to the slider connection hole by the connection member; and
- a first fixing bar to which the elastic member is fixed.

16. The oven of claim 15, wherein the hinge frame comprises:
- a plurality of support frame coupling holes coupled to a support frame disposed in the second door;
- a guide rail configured to guide a movement of the slider;
- a guide hole configured to guide the support rod; and
- a second fixing bar to which the elastic member is fixed.

17. The oven of claim 16, wherein the guide rail comprises:
- a first stopper configured to restrict the movement of the slider when the second door is closed; and
- a second stopper configured to restrict the movement of the slider when the second door is opened.

18. The oven of claim 17, wherein the elastic member is configured to:
- accumulate, when the second door is opened, the elastic force while the slider moves from the first stopper to the second stopper along the guide rail; and
- when the second door is closed, provide the elastic force in the direction in which the second door is closed such that the slider moves from the second stopper to the first stopper along the guide rail.

19. An oven comprising:
- a main body;
- a cooking chamber which is formed inside of the main body;
- a first door rotatably coupled to the main body by a first hinge unit, and configured to open or close the cooking chamber, and including a door frame having an opening;
- a second door rotatably coupled to the first door, and configured to open or close the opening; and
- at least one reinforcing unit coupled to the door frame, and configured to prevent deformation of the first door, the at least one reinforcing unit having a U-shaped cross-section.

20. The oven of claim 19,
- wherein the at least one reinforcing unit extends in a vertical direction of the first door, and is coupled to both sides of the door frame, and
- wherein the at least one reinforcing unit comprises:
  - a reinforcing bracket having a U-shaped cross-section and coupled to the door frame, and
  - a reinforcing frame having a U-shaped cross-section and coupled to the reinforcing bracket.

21. The oven of claim 19, further comprising:
- a first door frame coupled to the first door and the second door; and
- a second door frame only coupled to the first door.

* * * * *